(12) United States Patent
Kvalnes et al.

(10) Patent No.: US 12,339,981 B2
(45) Date of Patent: Jun. 24, 2025

(54) PREVENTING ILLICIT DATA TRANSFER AND STORAGE

(71) Applicant: Microsoft Technology Licensing, LLC

(72) Inventors: Åge Kvalnes, Oslo (NO); Jan-Ove Karlberg, Troms (NO); Kai-Marius Pedersen, Troms (NO); Ronny Jensen, Troms (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 442 days.

(21) Appl. No.: 17/654,326

(22) Filed: Mar. 10, 2022

(65) Prior Publication Data

US 2023/0289457 A1    Sep. 14, 2023

(51) Int. Cl.
*G06F 21/62* (2013.01)
(52) U.S. Cl.
CPC .................. *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 10,404,757 B1* | 9/2019 | Horton | H04L 67/02 |
| 2013/0312117 A1* | 11/2013 | Sapp, II | G06F 21/62 |
| | | | 726/30 |
| 2018/0052962 A1* | 2/2018 | Van Der Koijk | G16H 70/20 |
| 2019/0138744 A1* | 5/2019 | Ruggiero | H04L 63/0807 |
| 2020/0012799 A1* | 1/2020 | Breuer | G06F 3/0622 |
| 2022/0058069 A1* | 2/2022 | Bhatia | G06F 16/2379 |
| 2023/0004322 A1* | 1/2023 | Nayak | G06F 3/0658 |

OTHER PUBLICATIONS

"International Search Report and Written Opinion issued in PCT Application No. PCT/US22/052498", Mailed Date: Mar. 16, 2023, 11 Pages.

* cited by examiner

*Primary Examiner* — Dao Q Ho

(57) ABSTRACT

Examples of the present disclosure describe systems and methods for preventing illicit data transfer and storage. In aspects, a computing platform may receive a data request from a caller system, device, or service. The computing platform may identify data items/properties associated with the data request and retrieve one or more rules relevant to the caller and/or caller location. The retrieved rule(s) may be used to evaluate the data item(s) such that data items, data item content, and/or data item properties that are prohibited by the retrieved rule(s) from being manipulated (e.g., accessed, transferred, stored) are removed from the identified data item(s). Based on the evaluation of the identified data item(s), one or more relevant status codes may be set. The computing platform may then manipulate the identified data item(s) in accordance with the data request and provide a processing response to the caller.

20 Claims, 10 Drawing Sheets

PREVENTING ILLICIT DATA TRANSFER AND STORAGE

BACKGROUND

Data security is the process of protecting data and other digital information from unauthorized access and corruption. As data security is a paramount concern in nearly every computing environment, various approaches to implementing data security have evolved. Many of these approaches incorporate rule-based analyses that dictate, among other things, which entities may access which data and which data may be transmitted to/from and stored by which entities and locations. In many cases, different entities implement different rules for manipulating the same or similar data. This inconsistent application of rules to data forces developers and other parties that manage or provide access to the data to account for a potentially unwieldy set of rules in their attempts to prevent the illicit transfer and storage of data. Unfortunately, these attempts are not always successful due to the inconsistencies between the disparate rules and the manners in which the rules are applied.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for preventing illicit data transfer and storage. In aspects, a computing platform facilitating data transfer and/or data storage may receive a data read request from a caller computer system, device, or service. The computing platform may retrieve one or more data items associated with the data read request and a provenance record for each of the retrieved data items or data item properties. The computing platform may also retrieve one or more rules relevant to the caller and/or the data read request. The retrieved rule(s) may be used to evaluate the retrieved data item(s) such that data items, data item content, and/or data item properties that are prohibited by the retrieved rule(s) from being transferred are removed from the data item to be transferred. Based on the evaluation of the retrieved data item(s), one or more relevant status codes may be set. The computing platform may then provide a payload comprising the evaluated data item(s) (or the portions of the evaluated data item(s) that may be transferred) and/or the relevant status code(s) to the caller in response to the data read request.

In other aspects, a computing platform facilitating data transfer and/or data storage may receive a data write request from a caller computer system, device, or service. The computing platform may use the data write request to query a storage mechanism to determine the storage capabilities of the storage mechanism. The computing platform may also retrieve one or more rules governing storage of the data item(s) and data item properties provided in the data write request. The retrieved rule(s) and storage mechanism capabilities may be used to evaluate the provided data item(s) such that the data items, data item content, and/or data item properties that are prohibited by the retrieved rule(s) from being stored in the storage mechanism are removed from the data item to be stored. Based on the evaluation of the provided data item(s), one or more relevant status codes may be set. The computing platform may store the evaluated data item(s) (or the portions of the evaluated data item(s) that may be stored) in the storage mechanism. A response comprising the relevant status codes for the data write request is then provided to the caller in response to the data write request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
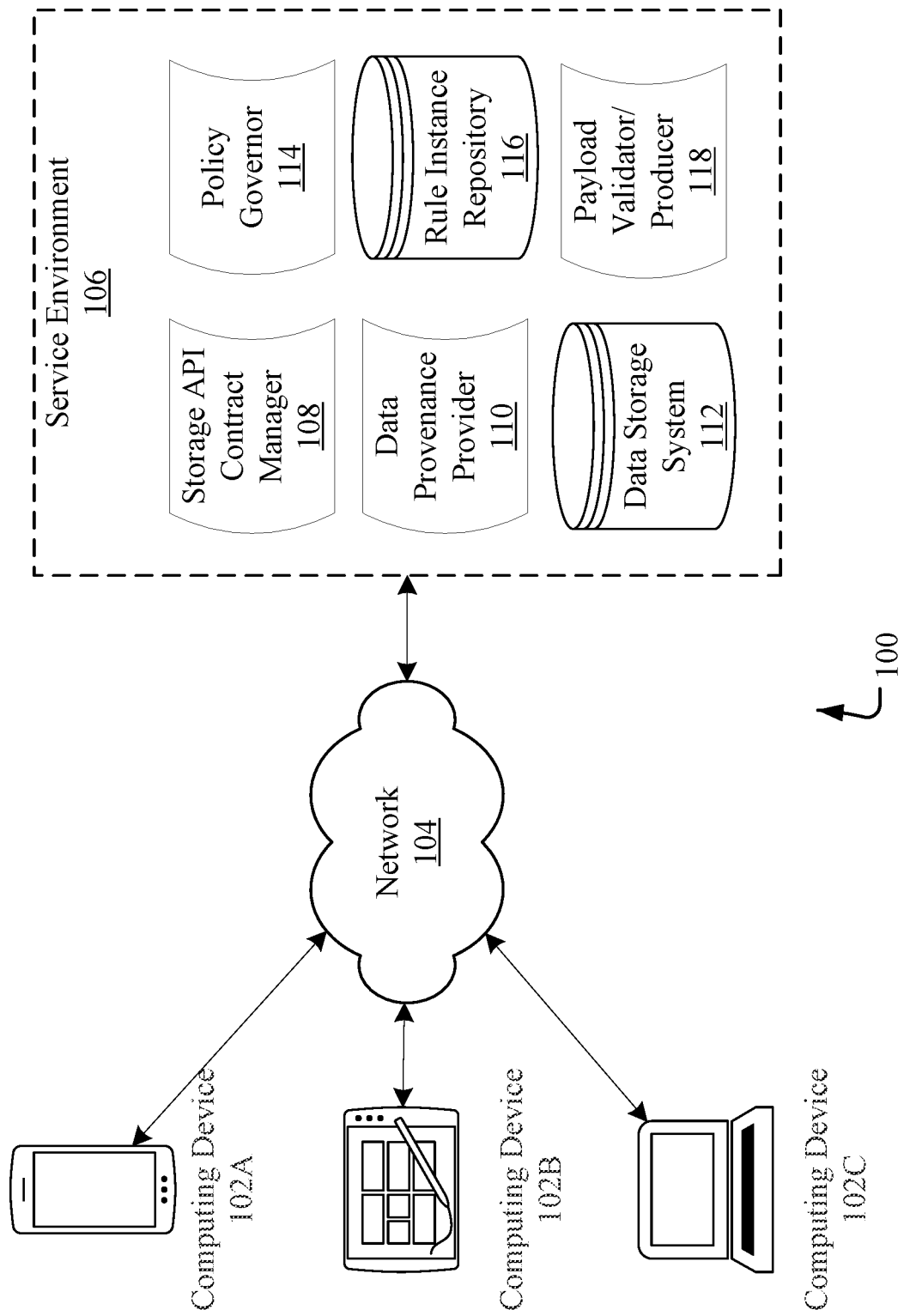
FIG. 1 illustrates an overview of an example system for preventing illicit data transfer and storage.

Ever-present concerns regarding data security have resulted in the evolution of several approaches for preventing the unauthorized access and corruption of data. Due to the varying circumstances, environments, and requirements of different entities, different approaches or different versions of the same (or a similar) approach are often utilized by different entities. As a result, entities often apply and enforce their own unique data access and storage rules/policies to their services, applications, and resources. In examples, rules for governing the access and transfer of data may be based on factors, such as the initiator of a transfer (e.g., whether a transfer is initiated by a user, an administrator, a feature/system), region-specific rules and regulations (e.g., General Data Protection Regulation (GDPR), Data Protection Act (DPA), California Consumer Privacy Act (CCPA), EU Data Boundary), data classification (e.g., metadata, consumer content, sensitive/private), and tenant administrative policies (e.g., permissible data transfer days/times, regions, computing devices, users). Rules for governing the storage of data may be based on factors, such as data classification, encryption requirements (e.g., asymmetric, symmetric, no encryption), data retention/lifetime, and tenant administrative policies.

In many cases, the data access and storage rules of one entity may conflict with the data access and storage rules of another entity. This conflict can cause rules to be enforced in such a manner that one set of rules supersedes another set of rules or incompatible (or even contradictory) rules from different sets of rules are concurrently or consecutively enforced. In order to address the resultant conflicts between disparate sets of rules, developers and other entities who provide access to data sources (or require access to data sources) are required to individually create solutions that enable enforcement of the disparate sets of rules. This requirement places a significant burden on the developers/entities to manually create and maintain rule-processing procedures and/or rule repositories. It also creates scenarios in which some developers/entities may be ineffective or untimely in their application or maintenance of the rule-processing procedures and/or rule repositories. Consequently, many developers/entities inadvertently thwart their own data security efforts, which can result in illicit data transfer and storage.

Aspects of the present disclosure address the above-described challenges with managing/implementing disparate sets of rules and describe systems and methods for preventing illicit data transfer and storage. In a first aspect, a computing platform that facilitates data transfer and/or data storage may receive a data read request from a caller computer system, device, or service. The data read request may be associated with a call context that identifies information about the caller and/or the call. In examples, a call context may comprise a call origin (e.g., a region from which a call originates), a call initiator (e.g., user initiated, administrator initiated, a feature/system initiated), a tenant identifier (e.g., identifying a user or group of users sharing access to a software instance or data source), a call timestamp, a call initiator access list (e.g., indicating the resources and data sources to which a caller has access), or the like.

The computing platform may retrieve one or more data items and/or data item properties associated with the data read request. Examples of data items include, but are not limited to, documents, tables, files, web content, applications, and services. Examples of data item properties include, but are not limited to, title, author name(s), subject, keywords, creation data, modification date(s), and similar metadata. The computing platform may attach a provenance record for each of the retrieved data items/properties. A provenance record may comprise data indicating the origin (e.g., geographical location) of a data item/property. The call context may be used to retrieve one or more rules (or sets of rules) relevant to the caller and/or the data read request. The retrieved rules may be used to evaluate the retrieved data items/properties. Evaluating the data items/properties may include determining whether any of the retrieved rules are applicable to (or otherwise operable to be executed against) the retrieved data items/properties. For example, if a rule dictates that a data item/property is prohibited from being transferred to/from a particular device or region, the data item/property may be removed from the data transfer.

Based on the evaluation of the retrieved data items/properties using the retrieved rules, one or more relevant status codes may be set. In examples, a status code may indicate that a data read request completed successfully, completed partially (e.g., one or more requested data items/properties were omitted from the result set), or could not be completed. A status code may further indicate when an illicit data transfer has been attempted and may provide details for the data items/properties and caller involved in the illicit data transfer attempt. The computing platform may generate a payload comprising the data items/properties that are permitted to be transferred to the caller. The payload may also comprise or be provided with any status codes that have been set for the data items/properties. The computing platform may then provide the payload to the caller in response to the data read request.

In a second aspect, a computing platform facilitating data transfer and/or data storage may receive a data write request from a caller computer system, device, or service. The data write request may comprise a payload including one or more data items/properties (or an indication thereof) and provenance records for each of the data items/properties. The data write request may be associated with a call context that identifies one or more attributes of the caller and/or the call. The computing platform may query the storage capabilities of a storage mechanism (e.g., encryption capabilities, data retention time, permissible data items/properties) to determine whether the data items/properties provided in the data write request can be stored in the storage mechanism. The call context may be used to retrieve one or more rules (or sets of rules) relevant to the caller and/or the data write request. The computing platform may use the retrieved rules and the storage capabilities of a storage mechanism to evaluate the retrieved data items/properties. For example, if a rule dictates that a data item/property is prohibited from being stored on a particular type of device or for longer that a particular period of time, the data item/property may be prevented from being stored in a particular storage mechanism.

Based on the evaluation of the provided data items/properties and/or the storage capabilities of the storage mechanism, one or more relevant status codes may be set and the data items/properties in the payload that are permitted to be stored may be stored in the storage mechanism. The status codes may indicate when illicit data storage has been attempted and may provide details for the data items/properties and caller involved in the illicit data storage attempt. The computing platform may then provide any status codes that have been set for the data items/properties to the caller in response to the data write request.

FIG. 1 illustrates an overview of an example system for preventing illicit data transfer and storage. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein may be implemented on a single processing device. The processing device may provide an operating environment for software components to execute and utilize resources or facilities of such a system. An example of one or more processing devices comprising such an operating environment is depicted in FIGS. 6-9. In another example, the components of systems disclosed herein may be distributed across multiple processing devices. For instance, input may be entered on a user device or client device and information may be processed on or accessed from other devices in a network, such as one or more remote cloud devices or web server devices. Although examples in FIG. 1 and subsequent figures will be discussed in the context of data transfer and storage rules, the examples are equally applicable to other contexts, such as data access rules, data creation/modification/deletion rules, and data usage rules, among others.

In FIG. 1, system 100 comprises user devices 102A, 102B, and 102C (collectively "user device(s) 102"), network 104, service environment 106, Storage API Contract Manager (SACM) 108, Data Provenance Provider (DPP) 110, Data Storage System (DSS) 112, Policy Governor (PG) 114, Rule Instance Repository (RIR) 116, and Payload Validator/Producer (PVP) 118. One of skill in the art will appreciate that the scale and structure of systems such as system 100 may vary and may include additional or fewer components than those described in FIG. 1. As one example, the functionality of SACM 108, DPP 110, PG 114, and/or PVP 118 may be combined into a single component. As another example, one or more of DSS 112 and RIR 116 may be located externally to service environment 106.

User device(s) 102 may be configured to detect and/or collect input data from one or more users or devices. In some examples, the input data may correspond to user interaction with one or more software applications or services implemented by, or accessible to, user device(s) 102. In other examples, the input data may correspond to automated (non-user) actions of user device(s) 102, such as the automatic execution of scripts or sets of commands at scheduled times or in response to predetermined events. The input data may include, for example, voice input, touch input, text-based input, gesture input, video input, image input, and/or executable command input. The input data may be detected/collected using one or more sensor components of user device(s) 102. Examples of sensors include microphones, touch-based sensors, geolocation sensors, accelerometers, optical/magnetic sensors, gyroscopes, keyboards, and pointing/selection tools. Examples of user device(s) 102 may include, but are not limited to, personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

User device(s) 102 may transmit input data to and receive data from service environment 106 using network 104. Examples of network 104 may include a private area network (PAN), a local area network (LAN), a wide area network (WAN), and the like. Although network 104 is depicted as a single network, it is contemplated that network 104 may represent several networks of similar or varying types. As one example, two or more of user device(s) 102 may communicate with one another using a first LAN, user device(s) 102 may communicate with service environment 106 using a WAN, and the components of service environment 106 may communicate with one another using a second LAN and/or a WAN.

Service environment 106 may be configured to provide access to various computing services and resources (e.g., applications, devices, data sources, storage, processing power) over one or more networks, such as network 104. Service environment 106 may be implemented in a cloud-based or server-based environment using one or more computing devices, such as server devices (e.g., web servers, file servers, application servers, database servers), personal computers (PCs), virtual devices, and mobile devices. The computing devices may comprise one or more sensor components, as discussed with respect to user device(s) 102. Service environment 106 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)). In aspects, service environment 106 may comprise or provide access to SACM 108, DPP 110, DSS 112, PG 114, RIR 116, and PVP 118.

SACM 108 may be configured to provide an interface for managing the data transactions and/or storage capabilities of an underlying storage system. SACM 108 may receive input data transmitted from user device(s) 102. In examples, the input data may represent a data read request, a data write request, or a combination thereof. SACM 108 may validate a cryptographic signature (or another authentication mechanism) of the input data to verify the identity of the caller and the integrity of the input data. When the input data represents a data read request, SACM 108 may process the input data to identify one or more requested data items/properties and a call context associated with the caller (e.g., user device(s) 102 or a user associated therewith). SACM 108 may provide the requested data items/properties to DPP 110 and, in a synchronous or asynchronous action, validate and provide the call context to PG 114. When the input data represents a data write request, SACM 108 may process the input data to identify one or more requested data items/properties, provenance records for the data items/properties, and a call context associated with the caller. SACM 108 may interrogate PG 114 to retrieve one or more data storage rules and, in a synchronous or asynchronous action, query the storage capabilities of DSS 112 to determine whether the data items/properties in the data write request can be stored in DSS 112.

DPP 110 may be configured to provide provenance records for data items/properties. In examples, DPP 110 may retrieve one or more data items/properties from DSS 112 in accordance with a data read request. For instance, DPP 110 may use terms in the data read request to identify matching or related terms in DSS 112 based on search techniques or utilities, such as regular expressions, fuzzy logic, or other pattern matching logic. DPP 110 may generate and/or provide a provenance record for data items/properties retrieved from DSS 112. Each provenance record may comprise data indicating the origin and/or the transmission path of a data item/property. DPP 110 may attach or otherwise associate each provenance record to a corresponding data item/property. For example, DPP 110 may create a payload comprising a data item/property and affix a provenance record to the header portion or body portion of the payload. Alternatively, DPP 110 may create a first payload comprising a data item/property and a second payload comprising a corresponding provenance record, and link the first and second payloads.

DPP 110 may also provide classification data for data items/properties retrieved from DSS 112. The data classification process may occur at the data property level of the data items. For instance, each data property of a data item may be separately marked with classification data. The classification data may indicate, for example, whether a data property is metadata (which may be generally not be restricted from being transferred or stored), consumer content (which may be moderately restricted from being transferred or stored), or sensitive/private content (which may be heavy restricted from being transferred or stored). As a specific example, metadata may be able to be stored in an unencrypted storage system, whereas consumer content and sensitive/private content may only be stored in an encrypted storage system. In at least one example, the data classification process may additionally occur at the data item level. In some examples, DPP 110 may attach the classification data for the data items/properties to the corresponding data items/properties or to a payload created to include the data items/properties and corresponding provenance record. In either scenario, DPP 110 may cryptographically sign the data items/properties, provenance records, and/or classification data. DPP 110 may also provide the classification data to SACM 108 for determining the storage capabilities of DSS 112.

DSS 112 may be configured to store or provide access to data items/properties. For instance, DSS 112 may locally store a first set of data items/properties and may access one or more external data sources storing additional sets of data items/properties via network 104. The locally-stored first set of data items/properties may correspond to one or more data write requests received by service environment 106. In some examples, DSS 112 may also store or provide access to provenance records and/or classification data for data items/properties. DSS 112 may comprise storage capabilities relating to, for example, encryption schemes, data retention time, data items/properties storage types, data caching, and the like. Although DSS 112 is depicted in FIG. 1 as a single storage system, DSS 112 may represent multiple systems, devices, or instances thereof. For example, DSS 112 may be or may implement one or more databases, file systems, file directories, flat files, and/or virtualized storage systems.

PG 114 may be configured to provide data transfer and/or storage rules. In examples, PG 114 may have access to a call context provided by or associated with received input data. PG 114 may use the information included in the call context (e.g., call origin, a call initiator, a tenant identifier, caller access privileges) to identify and retrieve one or more sets of applicable rules from RIR 116. As one example, based on the location of the caller (as identified by the call origin), PG 114 may retrieve a set of rules governing data transfer/storage for the location. The set of rules may include or be accompanied by policies that have been imposed by lawmakers/regulators for the location. As another example, based on a tenant identifier, PG 114 may retrieve a set of rules established by/for a tenant identified by the tenant identifier (e.g., days/times data may be transmitted/stored, regions/locations to/from which data may be transmitted/stored, devices/users permitted to transmit/store data).

PG 114 may also be configured to facilitate rule arbitration and rule integration. In examples, PG 114 may evaluate each retrieved rule (or set of rules) to determine whether two or more rules conflict. Rules may be determined to conflict if one rule supersedes another rule or if enforcing two different rules on a data item/property would lead to contradictory results. When a conflict is identified between two or more rules, PG 114 may resolve the conflict using a decision-making mechanism, such as a machine learning model, a rule set, or similar decision logic. As one example, if two data storage rules for a caller location conflict, PG 114 may use rule prioritization logic to prioritize the most restrictive rule, the rule associated with the larger entity (e.g., region-specific rules supersede tenant-specific rules), the most current (e.g., up-to-date) rule, or the rule from the most trusted authority.

RIR 116 may be configured to store or provide access to one or more data transfer/storage rules. In examples, RIR 116 may retrieve rules (or sets of rules) from one or more data sources that may be maintained and/or owned by different parties. The data sources may include various repositories and other storage locations for regional-based rules, tenant-based rules, system/feature-based rules, service/application-based rules, and other types of rules created by or relating to various rule-making authorities. RIR 116 may retrieve rules from the various data sources periodically (e.g., according to a random or predetermined day/time schedule), upon user demand, or in response it the occurrence of an event (e.g., detecting an update to a rule repository, in response to a new contractual or political agreement, in response to updates to privacy laws or regulations). As one example, RIR 116 may be configured with a listener mechanism programmed to react to an input or signal indicating the occurrence of a specific event by calling an event handler. The event may correspond to, for example, the creation or publishing of a document, a news item, or other content (e.g., a tweet, a blog post, social media activity).

In some examples, RIR 116 may store the retrieved rules locally for an extended period of time (e.g., multiple months, multiple years, or permanently). In such examples, RIR 116 may be a single, centralized repository storing the currently-available and previously-available rules of several different repositories. In other examples, RIR 116 may store the retrieved rules for a brief period of time. For example, RIR 116 may retrieve rules in real-time during each runtime instance of a data read request or a data write request. RIR 116 may store the retrieved rules during the pendency of the request and delete the retrieved rules when the request has been completed or resolved. Alternatively, RIR 116 may temporarily cache the retrieved rules locally to benefit from performance improvements for future requests. In examples, RIR 116 may be or may implement one or more databases, file systems, file directories, flat files, and virtualized storage systems.

PVP 118 may be configured to evaluate whether the transfer/storage of data items/properties is permitted or considered illicit. In examples, PVP 118 may receive (or otherwise have access to) information associated with received input data, such as data transfer/storage rules, data items/properties, provenance records, and/or data classification information. For instance, PVP 118 may receive data transfer/storage rules from PG 114 and data items/properties, provenance records, and data classification information from DPP 110. PVP 118 may evaluate each data item/property and associated provenance record against the received rules. The evaluation may also include an analysis of the data classification information for each data item/property. For example, based on the caller location (identified by a provenance record) and the data classification of a data property, PVP 118 may evaluate rules defined for the caller location and/or data classification to determine whether the data property may be transmitted to/from or stored in a requested location. In such an example, a first rule (or set of rules) may dictate, for instance, that data properties that are metadata may be transmitted to and stored at the caller location, whereas a second rule (or set of rules) may dictate that data properties that are sensitive/private (e.g., health data, financial data, certain demographic data) may not be transmitted to or stored at the caller location.

PVP 118 may create one or more indications to mark the data items/properties that are determined to be ineligible for data transfer and/or storage (e.g., illicit) based on the evaluation of the data items/properties. The indication may include, for example, a status code, a flag, and/or a descriptive message of the reason a data item/property is ineligible. The indications may be used to remove/trim marked data items/properties. For example, a marked data property may be removed from a data item prior to transferring/storing the data item/properties. In such an example, although the data property is removed from the data properties to be transferred/stored, the data property is not removed from the underlying data item. The indications may be applied to the data items/properties and/or to a payload comprising the data items/properties. For instance, an HTTP response indicating partial content success (e.g., although the request succeeded, a portion of the requested content was not provided in the response) may be appended to a payload header, and a descriptive message for ineligible data items/properties may be included in the payload body.

PVP 118 may be further configured to cause a response to the received input data to be performed. For example, in response to a data read request, PVP 118 may cause a payload comprising one or more data items/properties that are eligible for data transfer and/or corresponding ineligibility indications to be generated and/or provided to a caller. As another example, in response to a data write request, PVP 118 may cause one or more data items/properties that are eligible for data storage to be written to/stored by DSS 112. A response comprising an indication of the data write request success status and any associated ineligibility indications may then be provided to the caller.

Figure 2:
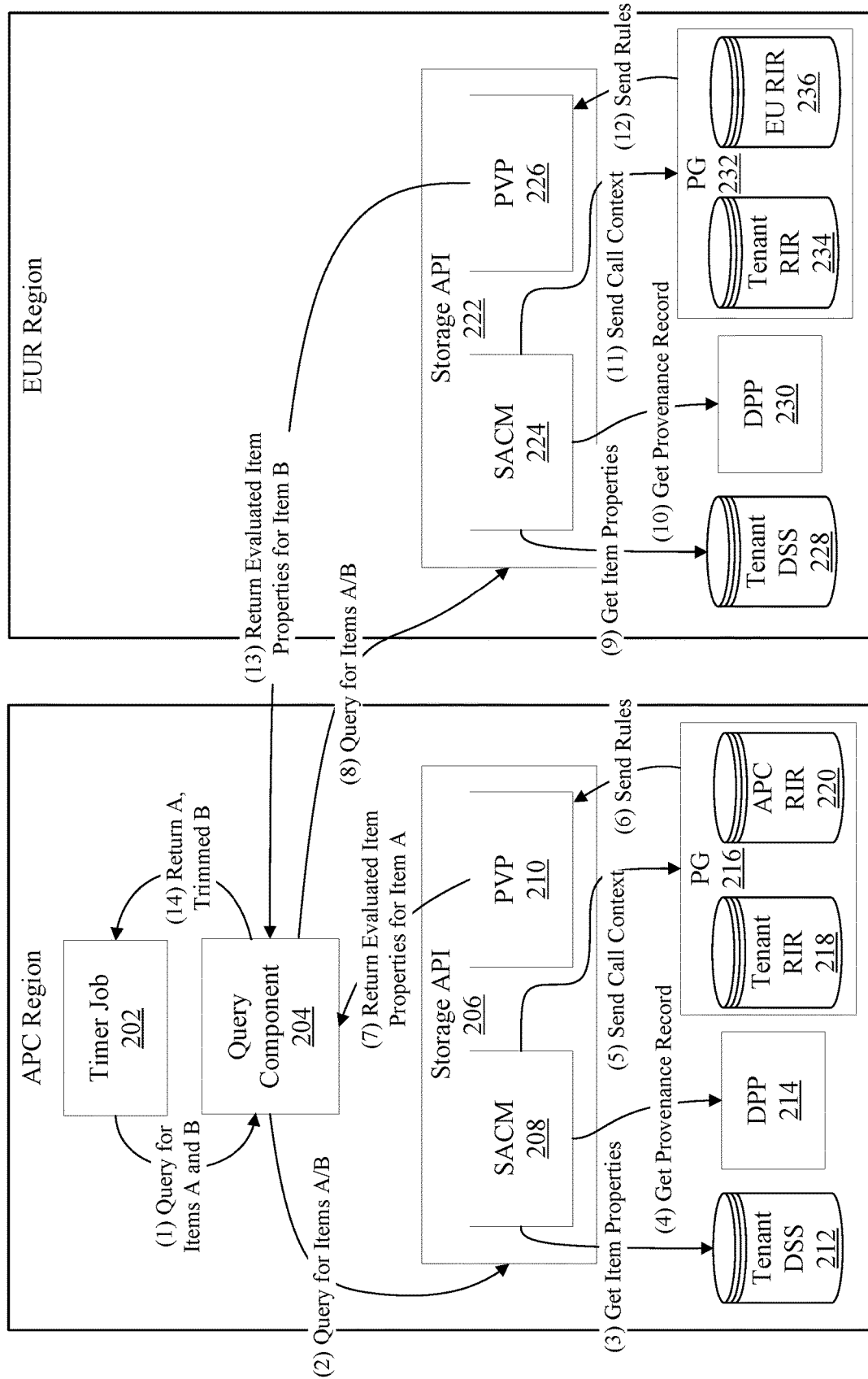
FIG. 2 illustrates an example process flow for processing a data read request.

FIG. 2 illustrates an example process flow for processing a data read request. The examples process flow represents a call that is a cross-region query (e.g., a query indicating data items in multiple regions) initiated by a caller system (e.g., initiated automatically by a feature of a system, such as a timer job). As indicated in FIG. 2, the call originates from an automated system timer job in the Asia-Pacific (APC) region and requests the retrieval of item A (stored in the APC region) and item B (stored in the European (EUR) region). Example process flow 200 begins at timer job 202, where a data read request for items A and B is submitted to query component 204. The data read request comprises a call context indicating at least the call initiator (e.g., the system executing the timer job) and the caller origin (e.g., the location of the system). Query component 204 provides the data read request for item A to storage API 206, which comprises SACM 208 and PVP 210. SACM 208 retrieves item properties for item A from a tenant DSS 212 and retrieves the provenance record for item A from DPP 214. In an alternative example, SACM 208 may route the data read request to DPP 214 and DPP 214 may retrieve the item properties and provenance record for item A.

SACM 208 provides the call context to PG 216, which comprises tenant RIR 218 and APC RIR 220. PG 216 retrieves up-to-date data transfer rules (e.g., refreshes rules) relevant to the call context from tenant RIR 218 and APC RIR 220, and provides the rules to PVP 210. PVP 210 evaluates the retrieved rules and the provenance record for item A to determine whether any item properties of item A are prohibited from being transferred to the caller system. In this example, no rules from tenant RIR 218 or APC RIR 220 prohibit any of the item properties of item A from being transferred to the caller system. Accordingly, PVP 210 determines that no item properties of item A are prohibited from being transferred to the caller system. Based on this determination, storage API 206 provides the item properties for item A to query component 204.

Query component 204 then provides the data read request for item B to storage API 222, which comprises SACM 224 and PVP 226. In an alternative example, query component 204 may provide the data read request to storage API 206 and storage API 222 concurrently. Additionally, query component 204 may provide the data read requests for item A and item B to storage API 206 and storage API 222. In process flow 200, SACM 224 retrieves item properties for item B from tenant DSS 228 and retrieves the provenance record for item B from DPP 230. SACM 224 provides the call context to PG 232, which comprises tenant MR 234 and EUR RIR 236. PG 232 retrieves up-to-date data transfer rules (e.g., refreshes rule set) relevant to the call context from tenant RIR 234 and EUR RIR 236, and provides the rules to PVP 226.

PVP 226 evaluates the rules and the provenance record for item B to determine whether any item properties of item B are prohibited from being transferred across the EUR/APC boundary to the caller system. In this example, one or more rules from tenant RIR 234 and/or EUR RIR 236 prohibit one or more item properties of item B from being transferred to the caller system. As a specific example, EUR RIR 236 may include a rule prohibiting the transfer of sensitive/private item properties from the EUR region to the APC region. Accordingly, PVP 226 determines that each item property of item B that is designated as sensitive/private is prohibited from being transferred to the caller system. PVP 226 removes/trims the sensitive/private item properties from item B (or otherwise makes the sensitive/private item properties of item B inaccessible). Storage API 222 provides the remaining item properties of item B (e.g., the item properties that have not been removed/trimmed from item B) to query component 204. Query component 204 then provides the item properties for item A (which comprise all of the item properties for item A) and the item properties for item B (which comprise the remaining item properties for item B) to the caller system in response to the timer job query for item A and item B.

Figure 3:
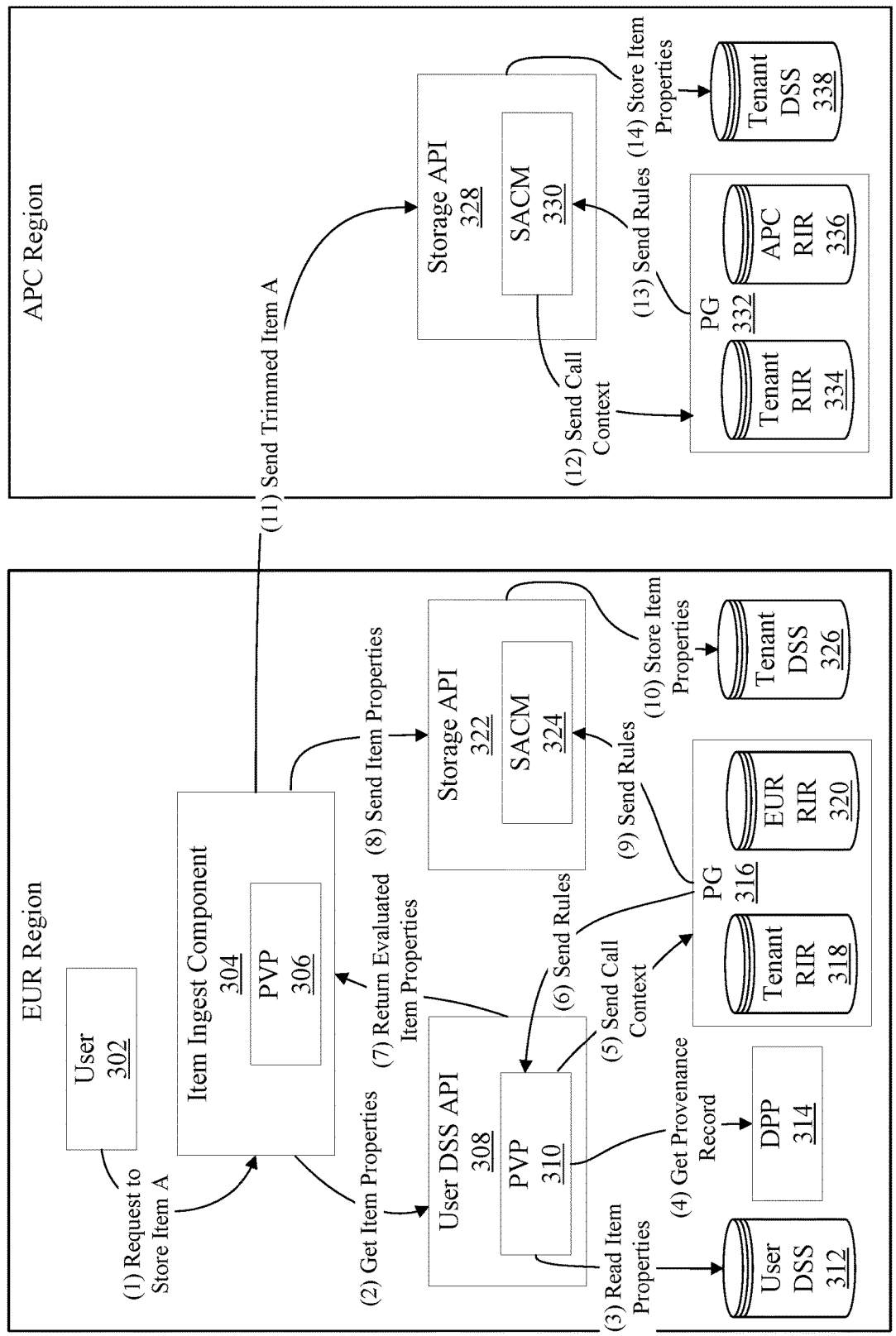
FIG. 3 illustrates an example process flow for processing a data write request.

FIG. 3 illustrates an example process flow for processing a data write request. The example process flow represents a call that is a cross-region write request (e.g., a write request to storage systems in multiple regions) initiated by a user. As indicated in FIG. 3, the call originates from the European (EUR) region and requests storage of a data item in the (EUR) region and the Asia-Pacific (APC) region. Example process flow 300 begins at user 302, where a data write request for item A is submitted to item ingest component 304, which comprises PVP 306. The data write request comprises a provenance record for each data item/property and a call context indicating at least the call initiator (e.g., user 302 or a device of user 302) and the caller origin (e.g., the location of user 302 or a device of user 302). Item ingest component 304 provides a request for the item properties of item A to user DSS API 308, which comprises PVP 310. PVP 310 retrieves item properties for item A from a user DSS 312 and retrieves the provenance record for item A from DPP 314.

PVP 310 provides the call context to PG 316, which comprises tenant RIR 318 and EUR RIR 320. PG 316 retrieves up-to-date data storage rules (e.g., refreshes rules) relevant to the call context from tenant RIR 318 and EUR RIR 320, and provides the rules to PVP 310. PVP 310 evaluates the retrieved rules and the provenance record for item A to determine whether any item properties of item A are prohibited from being stored by tenant DSS 326. In this example, no rules from tenant RIR 318 and EUR RIR 320 prohibit any of the item properties of item A from being stored by tenant DSS 326. Accordingly, PVP 310 determines that no item properties of item A are prohibited from being stored by tenant DSS 326. Based on this determination, storage user DSS API 308 provides the item properties for item A to item ingest component 304.

PVP 306 may also evaluate a set of rules and/or the provenance record for item A to determine whether any item properties of item A are prohibited from being stored by tenant DSS 326. The rules evaluated by PVP 306 may include those retrieved from tenant RIR 318 or EUR RIR 320 in addition to rules retrieved from one or more additional rule repositories or authorities. In this example, none of the evaluated rules prohibit any of the item properties of item A from being stored by tenant DSS 326. Accordingly, PVP 306 determines that no item properties of item A are prohibited from being stored by tenant DSS 326. Based on this determination, item ingest component 304 provides the item properties for item A, the provenance record for item A, and/or the call context to storage API 322, which comprises SACM 324.

SACM 324 retrieves up-to-date data storage rules (e.g., refreshes rules) relevant to the call context from tenant RIR 318 and EUR RIR 320 (or accesses the rules previously retrieved by PVP 306 or PVP 310). SACM 324 evaluates the retrieved rules and/or the provenance record for item A to determine whether the storage system capabilities of tenant DSS 326 prohibit any item properties of item A from being stored by tenant DSS 326. In examples, the storage system capabilities of tenant DSS 326 may be known to SACM 324 or SACM 324 may query tenant DSS 326 in real-time to determine the storage system capabilities. In this example, the storage encryption scheme, data retention policies, and other system capabilities of tenant DSS 326 enable all of the item properties of item A to be stored by tenant DSS 326. Accordingly, SACM 324 determines that no item properties of item A are prohibited from being stored by tenant DSS 326. Based on this determination, storage API 322 provides all of the item properties for item A to tenant DSS 326, which stores each of the item properties for item A.

PVP 306 then evaluates the rules retrieved from tenant RIR 318 and EUR RIR 320 (and/or additional rules) to determine whether any item properties of item A are prohibited from being stored in the APC region. In an alternative example, PVP 306 may perform this evaluation concurrently with the evaluation of whether item properties of item A may be stored in tenant DSS 326. In this example, one or more rules from tenant RIR 318 and/or EUR RIR 320 prohibit one or more item properties of item A from being stored in the APC region. As a specific example, EUR RIR 320 may include a rule prohibiting the storage of sensitive/private item properties in any region outside of the EUR region. Accordingly, PVP 306 determines that each item property of item A that is designated as sensitive/private is prohibited from being stored in the APC region. PVP 306 removes/trims the sensitive/private item properties from item A (or otherwise makes the sensitive/private item properties of item A inaccessible).

Item ingest component 304 provides the remaining item properties of item A (e.g., the item properties that have not been removed/trimmed from item A) and/or the call context to storage API 328, which comprises SACM 330. SACM 330 provides the call context to PG 332 which comprises tenant RIR 334 and/or APR RIR 336. PG 332 retrieves up-to-date data storage rules (e.g., refreshes rules) relevant to data storage in the APC region from tenant RIR 334 and APR RIR 336. SACM 330 evaluates the retrieved rules to determine whether the storage system capabilities of tenant DSS 338 prohibit any item properties of item A from being stored by DSS 338. In examples, the storage system capabilities of tenant DSS 338 may be known to SACM 330 or SACM 330 may query tenant DSS 338 in real-time to determine the storage system capabilities. In this example, the storage system capabilities of tenant DSS 338 may prevent long term storage of the item properties of item A. As a specific example, a data retention policy for DSS 338 may dictate that data items originating from the EUR region may not be stored longer that three (3) days. Accordingly, SACM 330 may set a three (3) day expiration tag/parameter on item A or the data properties of item A. SACM 330 then provides the tagged, remaining item properties of item A to DSS 338, which stores each of the item properties.

Having described one or more systems that may employ aspects of the present disclosure, one or more methods for performing these aspects will now be described. In examples, methods 400 and 500 may be executed by a system, such as system 100 of FIG. 1. However, methods 400 and 500 are not limited to such systems. In other aspects, methods 400 and 500 may be performed by a single device or component that integrates the functionality of one or more components of system 100. In at least one aspect, methods 400 and 500 may be performed by one or more components of a distributed network, such as a web service or a distributed network service (e.g., cloud service).

Figure 4:
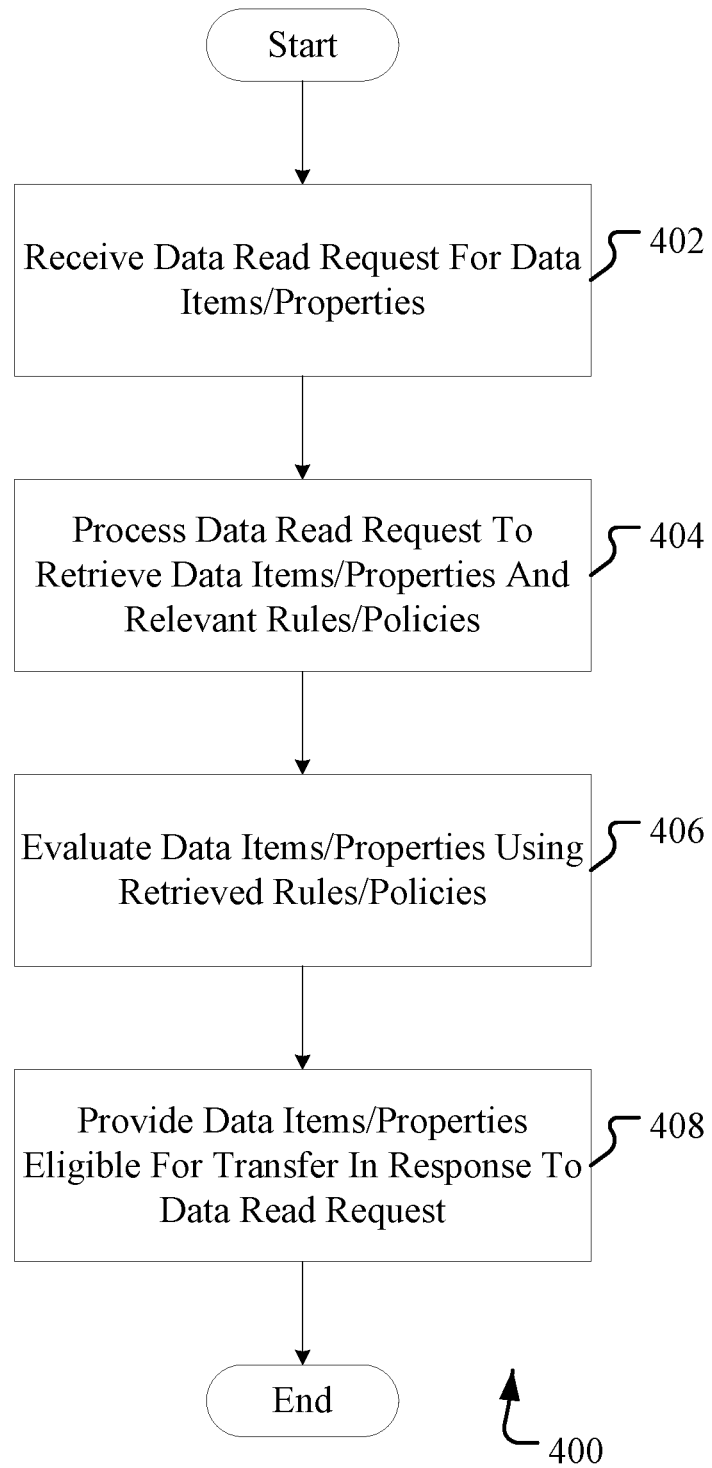
FIG. 4 illustrates an example method for preventing illicit data transfer.

FIG. 4 illustrates an example method for preventing illicit data transfer. Example method 400 begins at operation 402, where a data read request is received by a service environment that provides access to one or more data sources, services, or resources, such as service environment 106. In examples, the data read request may comprise one or more requested data items/properties and a call context associated with the caller of the data read request. The call context may be cryptographically signed by the caller and may enable the service environment to identify, for example, the caller or tenant, the call initiator type (e.g., user, admin, system/feature), the location of the caller, the date/time of the call, the service/application performing the call, the model/configuration of the caller device, network information of the caller, etc.

At operation 404, the data read request is processed by a storage management component, such as SACM 108. Processing the data read request may comprise using a data retrieval component, such as DPP 110, to retrieve data items/properties indicated by the data read request and a provenance record for each of the retrieved data items/properties. In examples, the data items/properties may be retrieved from one or more data sources, such as DSS 112. The data retrieval component may also be used to identify classification data for the retrieved data items/properties. The classification data may indicate privacy level attributes of the retrieved data items/properties, such as whether a data property is metadata, consumer content, publicly accessible, private/sensitive, related to a particular type of data (e.g., health data, demographic data, financial data), etc.

Processing the data read request may further comprise providing the call context to a policy component, such as PG 114. The policy component may retrieve rules and/or policies relevant to the data read request. The relevancy of rules/policies may be based on, for example, whether a rule/policy is intended to govern one or more aspects of transferring data relating to a caller, a type of caller, a class/model of devices, a location, a tenant, a data classification, an encryption scheme, or a data retention/life-time policy, among others. The rules/policies may be retrieved from one or more data sources, such as RIR 116. In some examples, the rules/policies may be cached locally by one or more components of the service environment to improve performance for data request processing.

At operation 406, the retrieved data items/properties are evaluated using the retrieved rules/policies. Evaluating the data items/properties may comprise using a validation component, such as PVP 118, to compare each retrieved data item/property to each retrieved rule/policy to determine whether a retrieved rule/policy prohibits the access/transfer of a data item or one or more properties of the data item. The evaluation may further comprise comparing the retrieved rules/policies to the retrieved classification data. In either comparison scenario, the comparison may include the use pattern matching techniques and/or one or more comparison rule sets. For instance, rules of a comparison rule set may dictate that certain types or names of data properties have a first level of sensitivity (e.g., public), other types or names of data properties have a second level of sensitivity (e.g., internal-only/confidential), and yet other types or names of data properties have a third level of sensitivity (e.g., restricted).

In examples, when a rule is determined to prohibit the transfer of a data property of a data item, the validation component may remove the data property from the data item (or otherwise cause the data property to be inaccessible). As a specific example, the validation component may set a status code and/or generate a message explaining the reason the data property was removed from (or made inaccessible to) the data item. The status code and/or message may be attached to or included in a payload comprising the data properties determined to be eligible for transfer. In some examples, a rule may be determined to prohibit the transfer of an entire data item. In such examples, the validation component may mark the data item accordingly and prevent the data item (e.g., all data properties of the data item) from being added to the payload.

At operation 408, a payload is provided to the caller in response to the data read request. The payload may comprise data properties determined to be eligible for transfer and one or more status code or messages corresponding to data items/properties that were ineligible for/prohibited from being transferred. In some examples, multiple payloads may be provided to a caller in response to a data read request. Each of the payloads may comprise data properties for a different data item in a set of data items associated with the data read request. After providing the payload to the caller, example method 400 ends.

Figure 5:
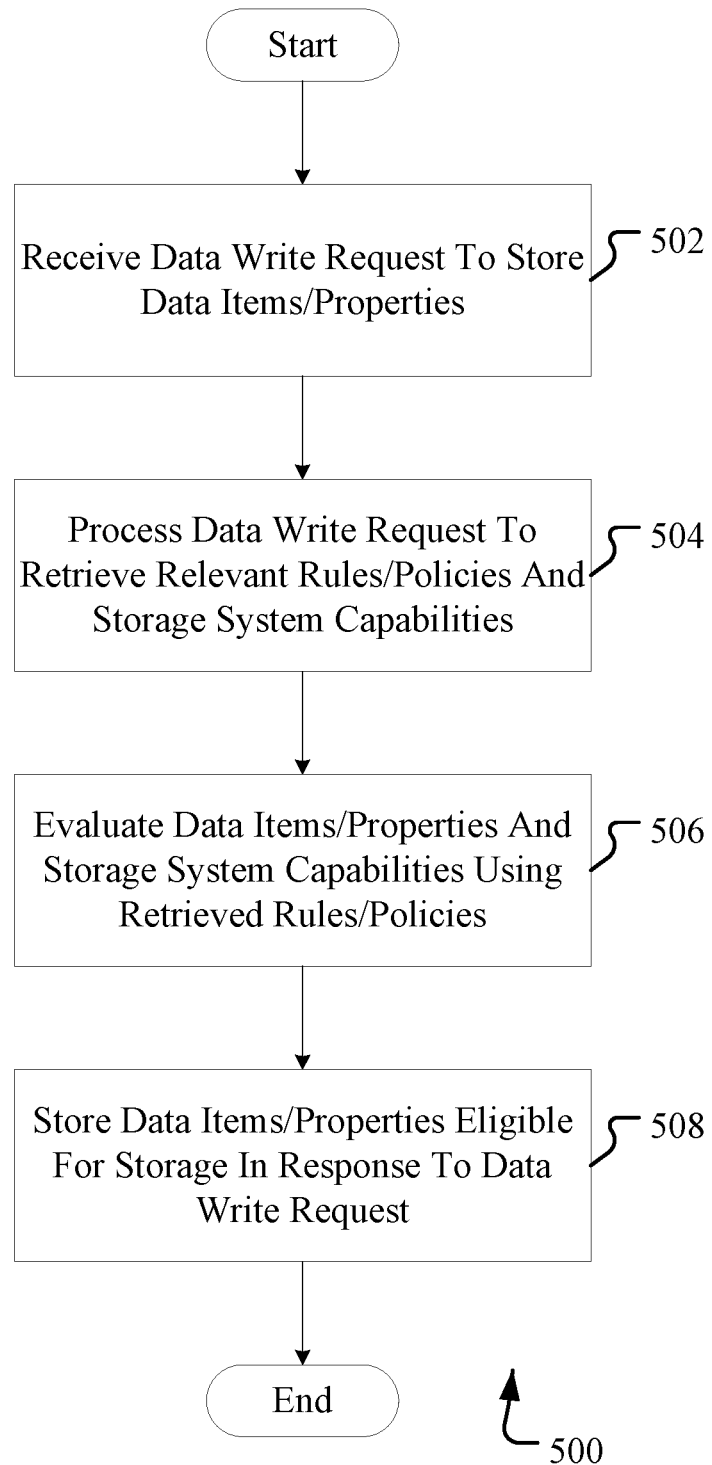
FIG. 5 illustrates an example method for preventing illicit data storage.

FIG. 5 illustrates an example method for preventing illicit data storage. Example method 500 begins at operation 502, where a data write request is received by a service environment that provides access to one or more data sources, services, or resources, such as service environment 106. In examples, the data write request may comprise or indicate one or more data items/properties, one or more provenance records for the data items/properties, and a call context associated with the caller of the data write request. The call context may be cryptographically signed by the caller and may enable the service environment to identify the caller, the call initiator type (e.g., user, administrator, system/feature), and the location from the caller.

At operation 504, the data write request is processed by a storage management component, such as SACM 108. Processing the data write request may comprise providing the call context to a policy component, such as PG 114. The policy component may retrieve rules and/or policies relevant to the data write request. The relevancy of rules/policies may be based on, for example, whether a rule/policy is intended to govern one or more aspects of storing data relating to a caller, a type of caller, a class/model of devices, a location, a tenant, a data classification, an encryption scheme, or a data retention/life-time policy, among others. The rules/policies may be retrieved from one or more data sources, such as RIR 116, and may be cached locally by the service environment. Processing the data write request may further comprise querying the storage capabilities (e.g., encryption scheme, data retention policy, permissible data items/properties) of a storage system, such as DSS 112. In examples where a data request indicates an intent to store data items/properties in multiple storage systems, each of the storage systems may be queried for respective storage capabilities.

At operation 506, the retrieved data items/properties are evaluated using the retrieved rules/policies. Evaluating the data items/properties may comprise using a validation component, such as PVP 118, to compare each retrieved data item/property to each retrieved rule/policy to determine whether a retrieved rule/policy prohibits the storage of a data item or one or more properties of the data item. The evaluation may further comprise comparing the retrieved rules/policies to classification data accessible to the validation component. For instance, the validation component may locally store classification data, retrieve classification data from a data retrieval component, such as DPP 110, or retrieve classification data from any other source. In either comparison scenario, the comparison may include the use pattern matching techniques and/or one or more comparison rule sets. For instance, rules of a comparison rule set may dictate that certain types or names of data properties have a first level of sensitivity (e.g., public), other types or names of data properties have a second level of sensitivity (e.g., internal-only/confidential), and yet other types or names of data properties have a third level of sensitivity (e.g., restricted).

In examples, when a rule is determined to prohibit the storage of a data property of a data item, the validation component may remove the data property from the data item (or otherwise cause the data property to be inaccessible). As a specific example, the validation component may set a status code and/or generate a message explaining the reason the data property was removed from (or made inaccessible to) the data item. The status code and/or message may be attached to or included in a payload to be provided to the caller. In some examples, a rule may be determined to prohibit the storage of an entire data item. In such examples, the validation component may mark the data item accordingly and prevent the data item (e.g., all data properties of the data item) from being stored.

At operation 508, the data items/properties that are eligible to stored are stored in the storage system. Storing the data items/properties may comprise storing the data items/properties, status indicators (e.g., status codes, flags, messages) associated with data items/properties that were ineligible/prohibited from being stored, and/or provenance records for the data items/properties. In some examples, after storing the data items/properties in the storage system, a response payload may be provided to a caller in response to the data write request. The response payload may comprise one or more status indicators and/or additional information relating to processing the data write request. After providing the response payload to the caller, example method 500 ends.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
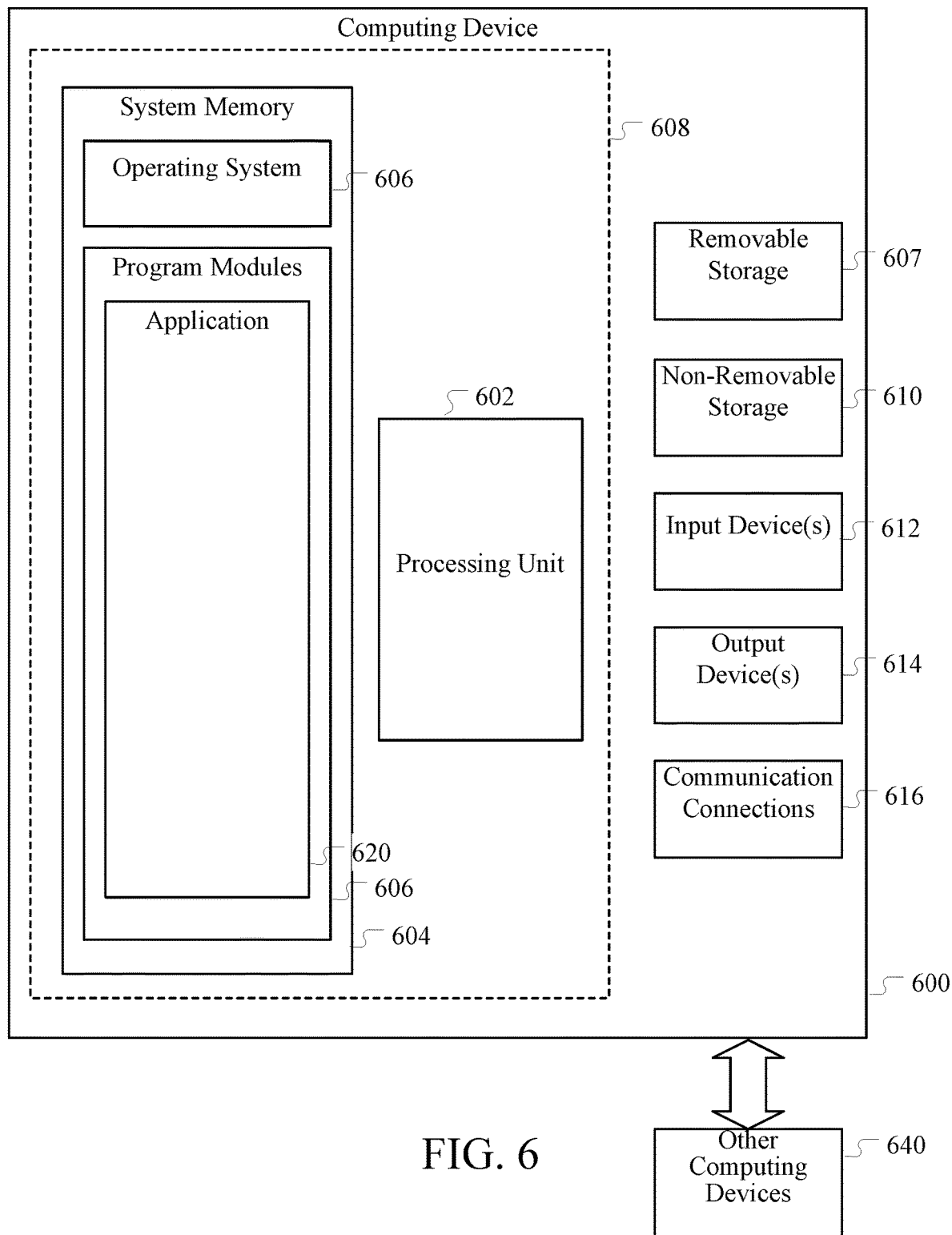
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 may include at least one processing unit 602 and a system memory 604.

Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 640. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
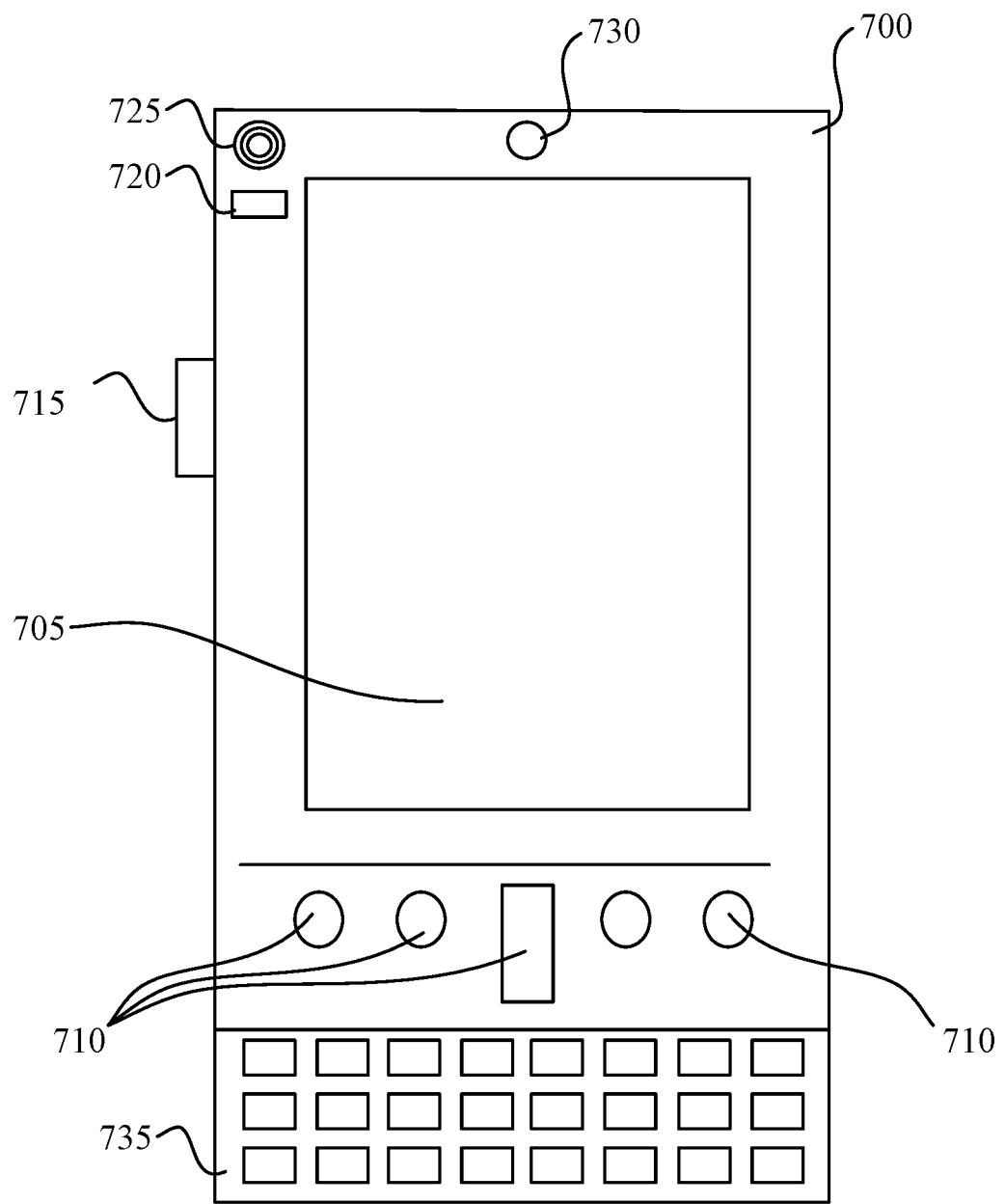
FIGS. 7A and 7B are simplified block diagrams of a mobile computing device with which aspects of the present disclosure may be practiced.
Figure 7B:
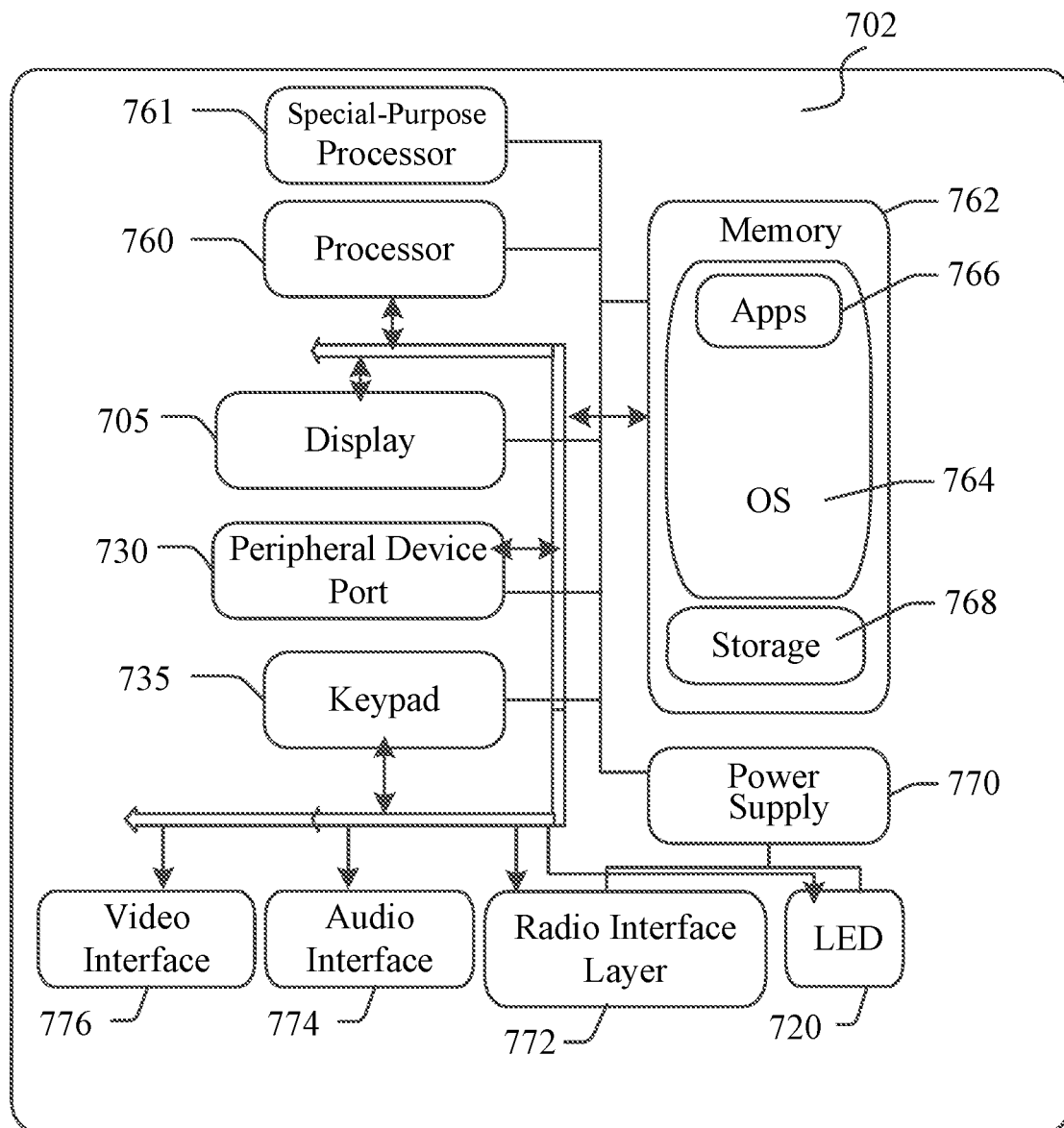

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor(s) (e.g., processor 760 and/or special-purpose processor 761) and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
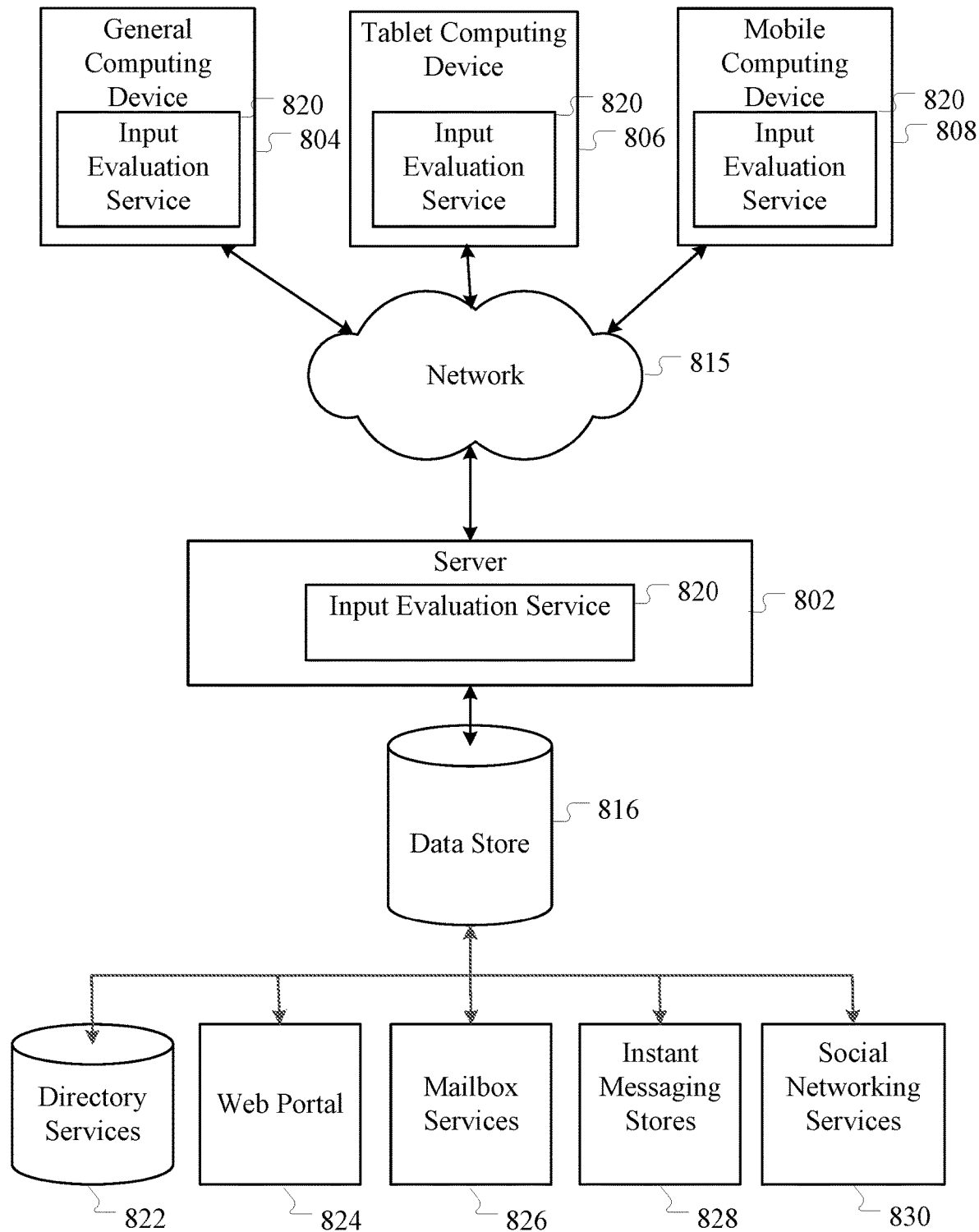
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An input evaluation service 820 may be employed by a client that communicates with server device 802, and/or input evaluation service 820 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
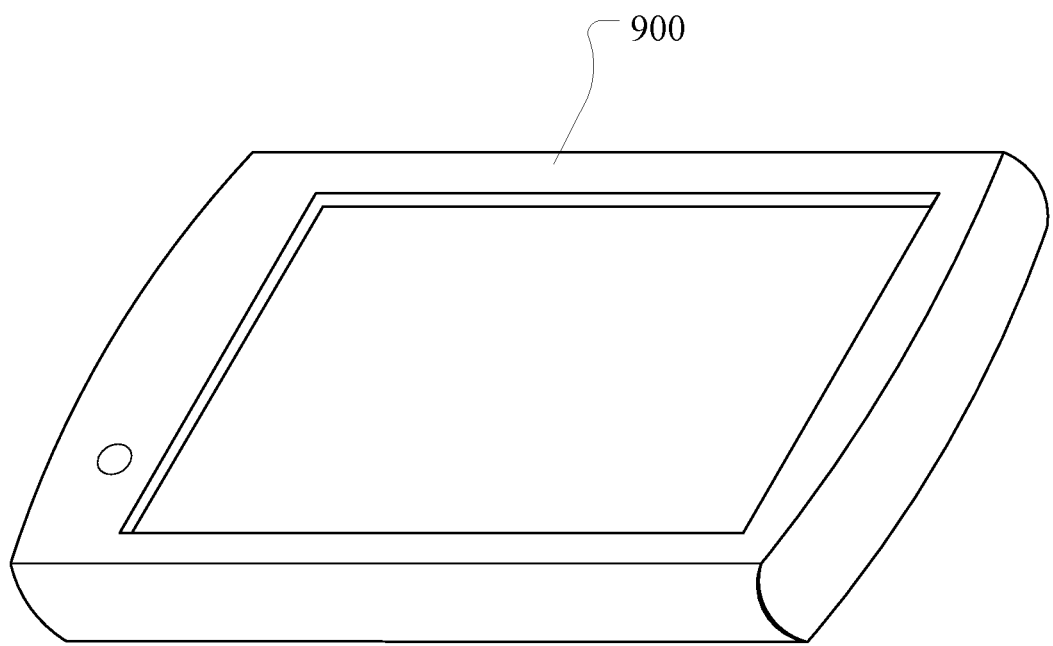
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Thus, the present disclosure provides a plurality of technical benefits and improvements over previous data security solutions. These technical benefits and improvements include but are not limited to: providing a computing platform with guardrails and safety mechanisms for detecting and prohibiting illicit data manipulation (e.g., access, transfer, storage) requests; providing a centralized rules/policies repository for storing rules/policies from disparate providers and authorities; enabling automated management and updating of the rules/policies repository; using current rules/policies to dynamically and automatically evaluate data manipulation requests at the data property level based on call context, data classifications, and/or storage system capabilities; providing a platform and services enabling developers building new products and services to automatically comply with current and future rules/policies/regulations relating to their products and services; and improving data security of data manipulation requests using cryptographically signed data and provenance records for data items/properties, among others.

As will be understood from the foregoing disclosure, one example of the technology relates to a system comprising: a processor; and memory coupled to the processor, the memory comprising computer executable instructions that, when executed by the processor, perform a method. The method comprises: receiving, from a caller, a data read request comprising one or more data properties of a data item and a call context; processing the data read request, wherein the processing comprises: retrieving the one or more data properties; retrieving a provenance record associated with the one or more data properties, wherein the provenance record indicates an origin location of the one or more data properties; and retrieving one or more rules relevant to the data read request; evaluating the one or more data properties using the one or more rules to determine whether the one or more rules prohibit the one or more data properties from being transferred to the caller; and providing, to the caller in response to the data read request, a payload comprising at least one property in the one or more data properties, wherein the one or more rules do not prohibit the at least one property from being transferred to the caller.

In another example, the technology relates to a system comprising: a processor; and memory coupled to the processor, the memory comprising computer executable instructions that, when executed by the processor, perform a method. The method comprises: receiving, from a caller, a data write request comprising one or more data properties of a data item, one or more provenance records, and a call context; processing the data write request, wherein the processing comprises: retrieving one or more rules relevant to the data write request; and identifying capabilities of one or more storage systems to be used to store the one or more data properties; evaluating the one or more data properties using the one or more rules to determine whether the one or more rules prohibit the one or more data properties from being stored in the one or more storage systems; and storing, in the one or more storage systems, at least one property in the one or more data properties, wherein the one or more rules do not prohibit the at least one property from being stored in the one or more storage systems.

In another example, the technology relates to a computer-implemented method. The method comprises: receiving, from a caller, a data read request comprising one or more data properties of a data item and a call context; processing the data read request, wherein the processing comprises: retrieving the one or more data properties; retrieving a provenance record associated with the one or more data properties, wherein the provenance record indicates an origin location of the one or more data properties; and retrieving one or more rules relevant to the data read request; evaluating the one or more data properties using the one or more rules to determine whether the one or more rules prohibit the one or more data properties from being transferred to the caller; and providing, to the caller in response to the data read request, a payload comprising at least one property in the one or more data properties, wherein the one or more rules do not prohibit the at least one property from being transferred to the caller.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, performs operations comprising:
receiving, by a storage application programming interface (API) of a computing environment, a data read request from a caller, the data read request comprising one or more data properties of a data item and a call context, wherein the call context indicates at least one of an identifier of the caller or a type of the caller;
processing the data read request, wherein the processing comprises:
retrieving, by the storage API, the one or more data properties from a tenant data storage system of the computing environment;
identifying, by the storage API, classification data for each of the one or more data properties, wherein the classification data is identified in a data provenance provider of the computing environment;
retrieving, by the storage API, a provenance record associated with the one or more data properties from the data provenance provider, wherein the provenance record indicates an origin location of the one or more data properties;
accessing a policy governor comprising a tenant rule instance repository and a computing environment rule instance repository, wherein:
the tenant rule instance repository comprises rules for transferring data items by a tenant environment within the computing environment; and
the computing environment rule instance repository comprises rules for transferring data items across or within boundaries of the computing environment; and
based on the call context, retrieving:
a first rule relevant to the data read request from at least one of the tenant rule instance repository or the computing environment rule instance repository; and
a second rule relevant to the data read request from at least one decentralized rules repository external to the system, wherein relevancy of the retrieved rules are based on whether the retrieved rules are to govern data transfers relating to at least one of the identifier of the caller or the type of the caller;
evaluating, by the storage API, the one or more data properties, the provenance record, and the classification data using the retrieved rules;
based on evaluating the one or more data properties, the provenance record, and the classification data, determining, by the storage API, that at least one of the retrieved rules, the provenance record, or the classification data prohibit a first data property in the one or more data properties from being transferred to the caller;
creating, by the storage API, an ineligibility indication specifying that the first data property is prohibited from being transferred to the caller;
generating, by the storage API and in response to the data read request, a payload:
comprising the provenance record, the classification data, the ineligibility indication, and a second data property in the one or more data properties, wherein the retrieved rules do not prohibit the second data property from being transferred to the caller; and
not comprising the first data property; and
providing, by the storage API, the payload to the caller in response to the data read request.

2. The system of claim 1, wherein the call context further indicates an initiation type for the data read request.

3. The system of claim 1, wherein the storage API:
provides the call context to the policy governor.

4. The system of claim 3, wherein the data provenance provider attaches a corresponding provenance record to each of the one or more data properties.

5. The system of claim 1, wherein evaluating the one or more data properties comprises using a validation mechanism to compare each of the one or more data properties to each of the retrieved rules.

6. The system of claim 5, wherein evaluating the one or more data properties further comprises using the validation mechanism to compare each of the retrieved rules to the classification data.

7. The system of claim 6, wherein the classification data indicates whether the one or more data properties relate to sensitive or private data.

8. The system of claim 1, wherein the ineligibility indicator corresponds to at least one of:
a status code;
a status flag; or
a status message.

9. A method comprising:
receiving, by a storage application programming interface (API) of a computing environment, a data read request from a caller, the data read request comprising one or more data properties of a data item and a call context, wherein the call context indicates an initiation type for the data read request;
processing the data read request, wherein the processing comprises:
retrieving, by the storage API, the one or more data properties from a tenant data storage system of the computing environment;
identifying, by the storage API, classification data for each of the one or more data properties, wherein the classification data is identified in a data provenance provider of the computing environment;
retrieving, by the storage API, a first provenance record associated with the one or more data properties from the data provenance provider, wherein the first provenance record indicates an origin location of the one or more data properties;
accessing a policy governor comprising a tenant rule instance repository and a computing environment rule instance repository, wherein:
the tenant rule instance repository comprises rules for transferring data items by a tenant environment within the computing environment; and
the computing environment rule instance repository comprises rules for transferring data items across or within boundaries of the computing environment; and
based on the call context, retrieving:
a first rule relevant to the data read request from at least one of the tenant rule instance repository or the computing environment rule instance repository; and
a second rule relevant to the data read request from at least one decentralized rules repository external to the system, wherein relevancy of the retrieved rules is based on whether the retrieved rules are to govern data transfers relating to the initiation type for the data read request; and cryptographically signing the one or more data properties, the first provenance record, and the classification data;

evaluating, by the storage API, the one or more data properties, the provenance record, and the classification data using the retrieved rules;

based on evaluating the one or more data properties, the first provenance record, and the classification data, determining, by the storage API, that at least one of the retrieved rules, the first provenance record, or the classification data prohibit a first data property in the one or more data properties from being transferred to the caller;

creating, by the storage API, an ineligibility indication specifying that the first data property is prohibited from being transferred to the caller;

generating, by the storage API in response to the data read request, a payload:
comprising the first provenance record, the classification data, the ineligibility indication, and a second data property in the one or more data properties, wherein the retrieved rules do not prohibit the second data property from being transferred to the caller; and
not comprising the first data property; and providing, by the storage API, the payload to the caller in response to the data read request.

10. The method of claim 9, wherein the call context further indicates a call initiator access list that indicates at least one of resources or data sources to which the caller has access.

11. The method of claim 9, wherein the one or more data properties include at least one of:
a subject of the data item; or
a keyword in the data item.

12. The method of claim 9, wherein the one or more data properties include:
a title of the data item;
an author of the data item; and
at least one of a creation date or a modification for the data item.

13. The method of claim 9, further comprising:
retrieving a second provenance record associated with the one or more data properties, wherein the first provenance record indicates a first origin location for the first data property and the second provenance record indicates a second origin location for the second data property.

14. The method of claim 13, wherein the payload further comprises the second provenance record.

15. The method of claim 9, wherein the ineligibility indication includes a descriptive message of a reason the first data property is prohibited from being transferred to the caller.

16. The method of claim 9, wherein the retrieved rules use types or names of the one or more data properties to determine sensitivity levels of the one or more data properties.

17. A service environment comprising:
a processor; and
memory coupled to the processor, the memory comprising computer executable instructions that, when executed by the processor, performs operations comprising:

receiving, by a data retrieval component of a computing environment, a data read request from a caller, the data read request comprising one or more data properties of a data item and a call context, wherein the call context indicates a location of the caller;

processing the data read request, wherein the processing comprises:
retrieving, by the data retrieval component, the one or more data properties from a data store of the service environment;
identifying, by the data retrieval component, classification data for each of the one or more data properties, wherein the classification data is identified in a data provenance provider of the computing environment;
retrieving, by the data retrieval component from the data store, a first provenance record associated with the one or more data properties from the data provenance provider, wherein the first provenance record indicates a transmission path of the one or more data properties from an origin to the service environment;
accessing a policy governor comprising a tenant rule instance repository and a computing environment rule instance repository, wherein:
the tenant rule instance repository comprises rules for transferring data items by a tenant environment within the computing environment; and
the computing environment rule instance repository comprises rules for transferring data items across or within boundaries of the computing environment; and
based on the call context, retrieving:
a first rule relevant to the data read request from at least one of the tenant rule instance repository or the computing environment rule instance repository; and
a second rule relevant to the data read request from at least one decentralized rules repository external to the system, wherein relevancy of the retrieved rules is determined by the policy governor component based on whether the retrieved rules are to govern data transfers relating to the location of the caller;
evaluating, by a payload validator component, the one or more data properties, the first provenance record, and the classification data using the retrieved rules;
based on evaluating the one or more data properties, the first provenance record, and the classification data, determining, by the payload validator component, that at least one of the retrieved rules, the first provenance record, or the classification data prohibit a first data property in the one or more data properties from being transferred to the caller;
creating, by the payload validator component, an ineligibility indication specifying that the first data property is prohibited from being transferred to the caller;
generating, in response to the data read request, a payload:
comprising the first provenance record, the classification data, the ineligibility indication, and a second data property in the one or more data properties, wherein the retrieved rules do not prohibit the second data property from being transferred to the caller; and
not comprising the first data property based on the ineligibility indication; and providing, by the data retrieval component, the payload to the caller in response to the data read request.

18. The service environment of claim 17, wherein the call context is cryptographically signed by the caller and indicates an initiation type for the data read request.

19. The service environment of claim 17, the operations further comprising:
retrieving a second provenance record associated with the one or more data properties, wherein the first provenance record indicates a first origin location for the first data property and the second provenance record indicates a second origin location for the second data property.

20. The service environment of claim 17, wherein the ineligibility indicator corresponds to at least one of:
a status code;
a status flag; or
a status message.

* * * * *